May 22, 1962 W. M. GRUBER 3,035,448
BALANCING MACHINE
Filed Oct. 17, 1957 2 Sheets-Sheet 1
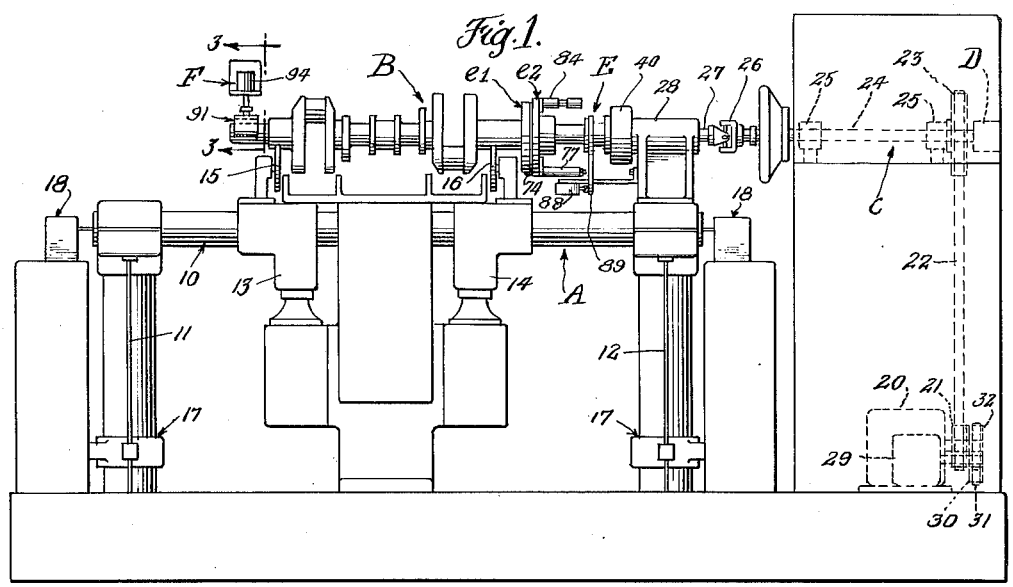
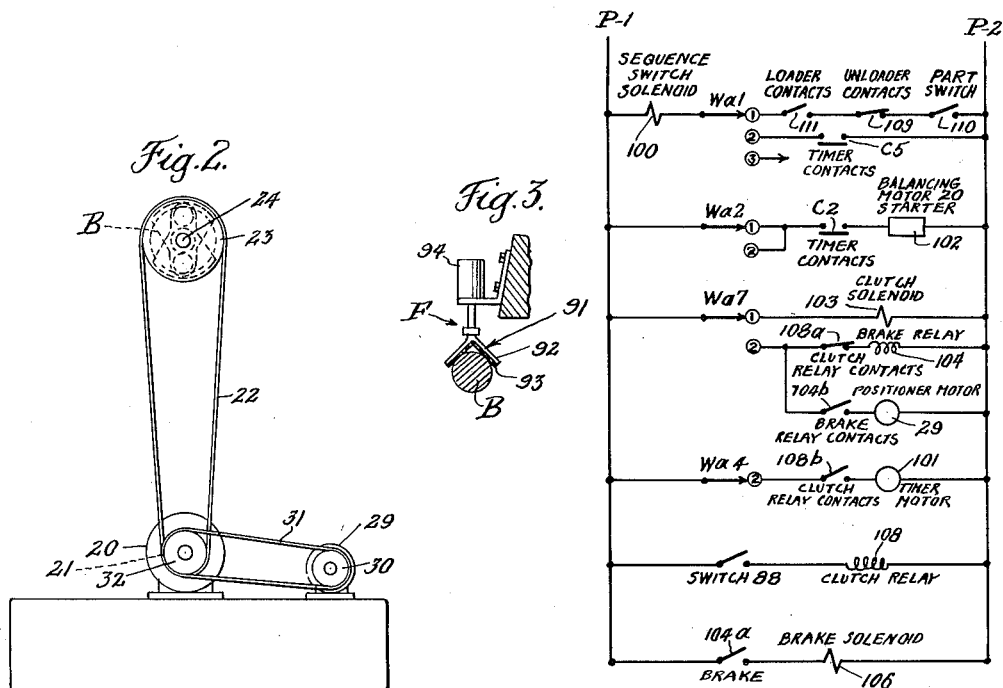
INVENTOR
WARREN M. GRUBER
BY
Synmestvedt + Lechner
ATTORNEYS

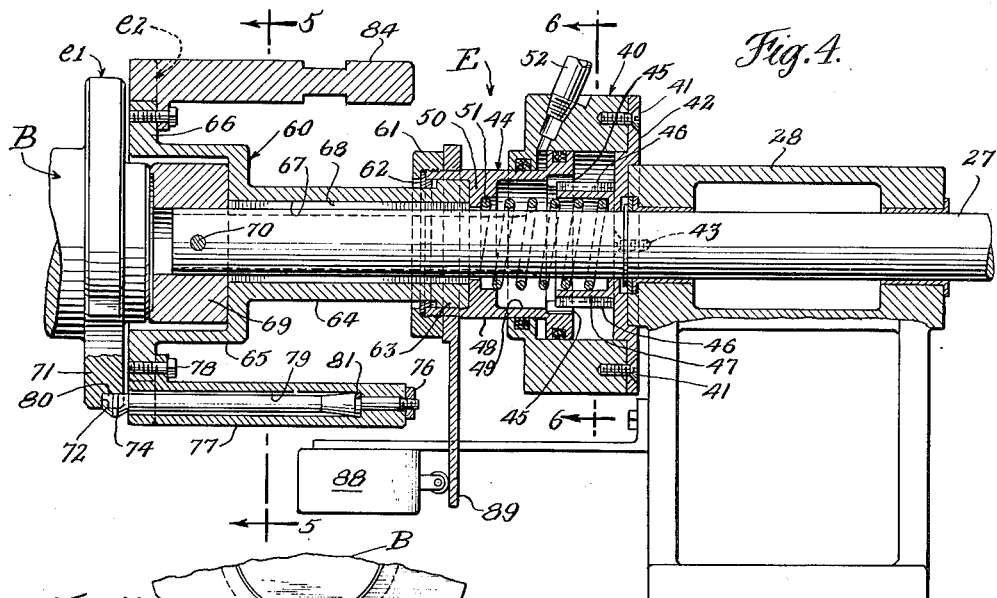
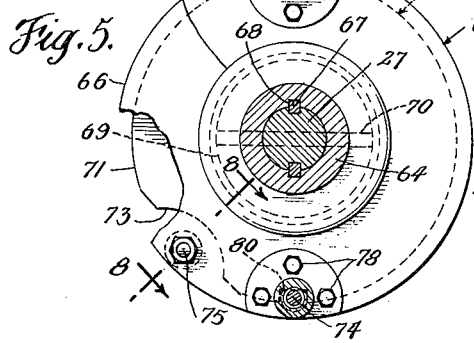
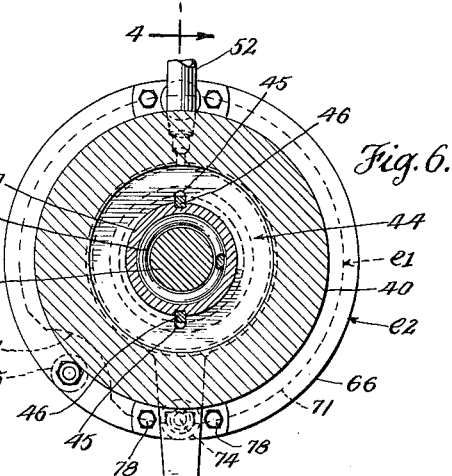
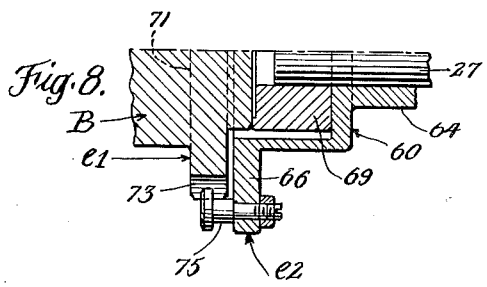
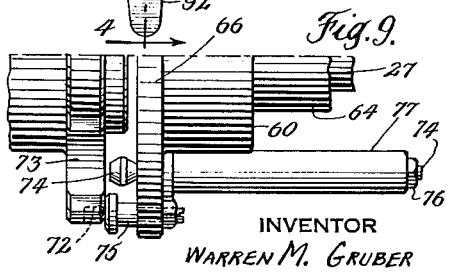

United States Patent Office 3,035,448
Patented May 22, 1962

3,035,448
BALANCING MACHINE
Warren M. Gruber, Horsham, Pa., assignor to Tinius Olsen Testing Machine Company, Willow Grove, Pa., a corporation of Pennsylvania
Filed Oct. 17, 1957, Ser. No. 690,685
4 Claims. (Cl. 73—460)

The present invention relates to balancing machines and particularly to such machines which are substantially completely automated.

The invention here finds especial utility in balancing machines having testing apparatus for determining the amount and location of unbalance in an article, together with mechanism for loading the article in the machine for the testing cycle and then unloading the same when the cycle has been completed, with the unbalance correction operation being performed at some remote station. Further, the invention is especially useful with composite type balancing machines which have not only testing apparatus for determining the amount and location of unbalance, but include integral correcting apparatus together with automatic means for loading the article for testing, automatic positioning of the article for correction and automatic unloading after the correction operation has been performed.

In machines of the kind mentioned, the angle or location of unbalance is determined with respect to some known or predetermined point on the article so that the article and/or the correcting means can be properly oriented for the correction operation. The mechanism for finding the angle of unbalance includes a reference generator developing a signal whose phase is a function of a known rotational position of the article together with means for developing another signal whose phase is a function of the actual position of unbalance in the article, the difference in phase of these signals being indicative of the angular location of the unbalance.

With balancing machines of the kind mentioned, it is necessary that each article placed in the machine be automatically, quickly and properly coordinated with the reference signal generator. If this is not done, considerable time may be lost, manual operations may have to be introduced and thus the essential purposes of automation are negated.

The principal objective of the present invention then is to provide equipment particularly for use with balancing machines of the kind mentioned which automatically and correctly couples the part to be balanced with the reference signal generator.

A preferred form of the invention and certain other objects and features thereof will be apparent from the following description and drawings wherein:

FIGURE 1 illustrates the manner in which the invention may be applied to one type of balancing machine;

FIGURE 2 is a diagrammatic and elevation looking toward the left in FIGURE 1 and illustrating certain drive mechanism;

FIGURE 3 is a fragmentary section taken on the line 3—3 of FIGURE 1 illustrating a brake employed in the apparatus of the invention;

FIGURE 4 is an enlarged longitudinal section taken on the line 4—4 of FIGURE 6 and illustrating a clutch arrangement employed in the invention;

FIGURE 5 is a cross section taken on the line 5—5 of FIGURE 4;

FIGURE 6 is a cross section taken on the line 6—6 of FIGURE 4;

FIGURE 7 is a fragmentary end view of a test article such as a crankshaft looking toward the left in FIGURE 4;

FIGURE 8 is a half section taken on the line 8—8 of FIGURE 5;

FIGURE 9 is a half front elevation illustrating certain relative positions of certain components of the invention; and FIGURE 10 is a schematic diagram of a circuit for operating certain components of the invention.

In my copending application 584,941, now Patent 2,909,948 I have disclosed a machine for determining and correcting dynamic unbalance in an article such as a crankshaft. In general, this machine comprises mechanism to automatically determine the amount and location of unbalance in the article together with the correcting mechanism and means to automatically position the crankshaft with respect to the correcting mechanism so that the correction is performed at the proper place. In practice, machines of this type have become fully automated in the sense of being provided with a mechanism which will automatically load a crankshaft to be balanced and then automatically unload the same after the test and correction operations have been performed. The present invention has been developed in connection with such automation and, therefore, will be described herein in connection with a machine such as disclosed in Patent 2,909,948, although it will be understood that the invention is not necessarily limited to such machine.

In FIGURE 1 I have shown an elevational view of the cradle shown in Patent 2,909,948, certain of the portions of this machine, such as correcting mechanism, being eliminated for the sake of clarity. Also, I have not shown any automatic load and unload equipment but, for purposes of discussion, it is pointed out that such may comprise a front loader and a back unloader, i.e., the loader feeds the shaft into the cradle in a direction which is generally perpendicular to and toward the plane of the paper and the unloader removes the shaft in a direction which is perpendicular to and away from the back side of the paper.

The cradle shown in FIGURE 1 is the so-called pivoted type and, while I have shown an embodiment of the invention as applied to that type of cradle, it will be understood that the invention is applicable where the non-pivoted type of cradle is used and also where the cradle is oriented so that the crankshaft rotation is in a plane other than horizontal.

In FIGURE 1 the cradle is generally designated by the letter A and the crankshaft which is rotatably mounted thereon is designated by the letter B. The drive mechanism which rotates the crankshaft, for example, during an unbalance determination operation, is generally designated by the letter C, and the reference generator which is coupled to the drive mechanism C and is used to develop the reference signal for use in determining the unbalance, is designated by the letter D. The clutch mechanism which couples the crankshaft, generator and drive mechanism is designated by E. A brake mechanism for use in the coupling operation is designated by F.

When a shaft is first placed in the cradle, it must be coupled with the driving mechanism so that the same can be rotated during the unbalance determining operation (and in this particular instance, be rotated by the driving mechanism for positioning the shaft with respect to the correction mechanism). As stated heretofore, the article must be coupled to the reference generator so that the signal thereof is related in time to a known rotational position of the article. After the unbalance determination has been made and the correction operation performed, the article is removed from the cradle and in doing so, it must be disconnected from the generator and drive mechanism. When the next article is placed in the machine, it must be coupled to the generator and drive mechanism in the same manner as the first. Since the drive mechanism and the generator include rotating members and since the article itself is rotatably mounted, it will be apparent that a special problem arises in correctly coupling each and every article.

The present invention provides a unique solution to this problem in that it is nicely adapted to fit into the automation scheme.

Referring to the drawings, the details of the invention will next be described. The cradle of FIGURE 1 comprises a generally rectangular frame 10 supported at each end by a pair of elastic rods 11 and 12, pivot mechanisms 13 and 14 mounting rollers 15 and 16 rotatably supporting the crankshaft B, cradle damping and tuning mechanisms 17 and unbalance signal pick-ups 18.

In general, the drive mechanism C includes a motor 20 turning a pulley 21 driving a belt 22 which in turn drives a pulley 23 connected to a drive shaft 24 rotatably mounted in the support bearings 25. The motor 20 provides power for rotating the crankshaft during an unbalance determining operation. The generator D is connected to the drive shaft 24 and rotated therewith. A universal joint 26 interconnects the shaft 24 with a shaft or spindle 27 rotatably mounted in the bearing support 28 mounted on the cradle 10. In the particular embodiment described, the drive mechanism also includes a positioner motor 29 having a pulley 30 driving a belt 31 which in turn drives a pulley 32 mounted integral with pulley 21. As will be apparent, the operation of either motor 20 or 29 will cause rotation of the shaft 27.

As disclosed in Patent 2,909,948, the function of the positioning motor is to rotate the crankshaft with respect to the correction mechanism so that the drills can remove metal at the right spot. In the present invention, the positioner motor 29 also performs an additional function in the coupling of the article with the generator and/or drive mechanism as will be described below.

The clutch E is connected to the drive shaft 27 and the function of the clutch is to connect and disconnect the article B with the drive mechanism or generator so that the article and generator are properly related. The clutch includes two rotatable elements $e_1$ and $e_2$, the element $e_1$ being connected to the article and the element $e_2$ being connected to the drive (shaft 27, etc.) and generator. When these elements are engaged, they rotate in unison and when disengaged are relatively rotatable. The element $e_2$ is movable toward element $e_1$ to effect engagement, and away to effect disengagement.

As mentioned heretofore, the clutch drivingly interconnects the article and generator in the proper manner. In the embodiment shown, this is done by providing an aperture in the element $e_1$ and a pin in the element $e_2$ which is adapted to be received by the aperture. The aperture bears a known relationship with some predetermined point on the article and the pin and its drive bear a predetermined relationship with the generator and when the pin and aperture are engaged, the phase (and magnitude) of the generator signal is the same each time the predetermined point on the article passes a given rotational position. For example, each time the known point passes through the horizontal plane, the generator signal is at the positively going cross-over point. In effecting engagement, the article, hence the element $e_1$, is held non-rotatable, for example, as by the brake means F, and the positioner motor 29 rotates the element $e_2$ until the aperture and pin become aligned; whereupon the element $e_2$ moves toward the element $e_1$ and the pin slips into place.

The details of the clutch arrangement will next be described.

Associated with and in surrounding relation to the spindle 27 is a cylinder 40 which is secured by screws 41 to an adapter plate 42 which in turn is secured to the housing 28 as by means of screws 43. A piston 44 surrounds the spindle 27 and operates in the cylinder 40. This piston is provided with key slots 45 (FIGS. 4 and 6) for sliding engagement with keys 46 carried by the neck 47 of the fixed adapted plate 42. Thus the piston is held against rotation but is free to move back and forth on the keys 46. The piston has a hollow shank portion 48, the internal diameter of which at 49 is such as to clear the keys 46 as the piston reciprocates.

The shank portion 48 of the piston is provided with an inner abutment wall 50 against which one end of the compression spring 51 seats. The other end of this spring seats in the neck 47 of the adapter plate. When fluid is admitted to the cylinder 40 from a suitable source by means of inlet pipe 52, the piston is moved to the right as viewed in FIGURE 4 and when the fluid pressure is relieved, the piston moves to the left under influence of the spring 51.

The piston 44 is connected to a rotatable driving member 60 by means of a retracting ring nut 61 screwed on the shank end of the piston and a split retracting ring 62 secured in place by the nut 61. The driving member 60 is provided with an annular flange 63 located between the retracting ring 62 and the abutment wall 50. It will be seen that the connection between the piston and the driving member is such that the driving member can freely rotate with respect to the non-rotatable piston. The driving member 60 has a tubular neck portion 64 at one end of which the annular flange 63 is provided and at the other end of which a cupped portion 65 having an end flange 66 is provided. The flange 66, member 60, etc., may be considered as element $e_2$ of the clutch. It will be apparent that the member 60 and flange 66 partake of the same axial or back and forth motion as the piston 50 depending on whether the spring 51 or fluid in cylinder 40 provides the activating force.

The neck portion 64 of the member 60 is provided with internal key-ways 67 having sliding fit with keys 68 carried by the spindle 27. A stop plug 69 screwed on the spindle 27 by a pin 70 is located in the cupped portion 65 of the driving member 60 and bears against the end of the crankshaft as a stop to limit the driving member 60 in its movement to the left. The member 60 and flange 66 rotate with the shaft 27, but are movable axially with respect thereto as explained above.

Referring to FIGURES 1 and 4, the crankshaft has an integrally-formed flange 71 and, with the tpe of crankshaft shown, I have utilized this flange as one element of the clutch, for example, the element $e_1$ mentioned heretofore. Other types of articles with which the invention may be used may not have such an integral flange. However, it is contemplated that in such instances some portion of the article other than the flange be used as an element, or alternatively, that one element of the clutch be secured to the article prior to loading in the machine. As best seen in FIGURES 5 and 7, the flange 71 is provided with an aperture 72 and a slot 73. The aperture 72 accepts the pin 74 and the slot 73 accepts the stud 75, the pin and stud both being mounted on the flange 66. The purpose of stud 75 will be explained later. The pin 74, when engaged with the aperture 72, serves to correctly couple the crankshaft and generator and provides for a driving interconnection. The aperture 72 on each shaft to be placed in the machine is related to some preselected point on the crankshaft and the pin 74 is fixed at a known point relative to the generator D. When the pin and aperture are engaged, the article and the generator are related so that each time a predetermined point on the crankshaft passes through say the horizontal plane, the generator signal has the same phase and magnitude. The manner in which the pin 74 is mounted will next be explained.

The pin 74 is secured by means of nut 76 in a holder 77 mounted adjacent the periphery of the flange 66 by bolts 78. In this instance the pin 74 is secured in the holder at one end by the nut 76 thus leaving the pin free for yielding movement in the clearance 79 provided between the pin and holder. The head of the pin 72 projects outwardly of the flange 66. Arranging the pin in yielding fashion is preferred because this enhances the ease with which the pin can slip into the aperture 72.

The head of the pin 74 is flattened at 80 to mate with the flat of the aperture 72 and the pin is prevented from turning in the holder 74 by a cross pin 81 (FIG. 4). When employing a single drive pin as shown in the drawings, a counterbalance stud 84 of proper weight is mounted in the flange 66 diametrically opposite the drive pin and holder to counterbalance the pin and holder. While in the particular embodiment illustrated a single drive pin is employed, it is to be understood that the employment of two or more pins is also contemplated. In cases where an even number of pins are employed they would be oppositely disposed for counterbalancing purposes.

Referring to FIGURE 9, when the fluid is relieved from the cylinder 40, the spring pushes the flange 66 toward the left and, assuming that the aperture 72 and the pin 74 are not in alignment, the stud 75 will strike the surface of the flange 71. With rotation of the flange 66 (by the position motor 29) the head of the stud 75 moves along the surface of the flange 66 (the crankshaft being held fixed by the brake F) until such time as the head of the stud moves into the slot 73. At this time the flange 66 is further moved to the left by the action of the spring 51 so that the pin 74 engages the surface. Continued rotation will then bring the pin 74 into alignment with the aperture 72 and under the action of the spring 51, the same will be forced into the aperture. The stud 75 when in engagement with flange 66 spaces the pin 74 from the flange and prevents the pin from chattering, as it will be recalled the pin is resiliently mounted. Also, it is pointed out that the head of the stud 75 is made large enough so that, in the event the rotation of the flange 66 first brings the stud into alignment with the aperture 72, the stud will merely pass over the same until it reaches its own aperture 73. It is contemplated in certain instances to employ rigid pins rather than the flexible type described above and in such cases the stud 75 may be dispensed with.

Referring to FIGURE 1, it will be seen that the bearing support 28 mounts a switch 88 which is adapted to be actuated by a finger 89 carried by the piston 44. When the piston 44 is activated so that the pin 74 is out of the aperture 72, finger 89 is out of engagement with the switch 88 and when the pin 74 is in the aperture 72, the finger 89 actuates the switch 88. The function of this switch will be explained below in connection with FIGURE 10.

The generator D may be of any known type that will develop the appropriate reference signal. For example, the generator may be of the photocell type or the cam-operated switch type. It is preferred, however, to use a generator such as disclosed in copending application 498,979. The brake F may be of conventional design; for example, as shown in FIGURE 3, the brake has a grip 91 comprising an angle member 92 having a brake liner 93, the grip being movable toward and away from the crankshaft by means of the actuator 94 which preferably comprises a cylinder having a spring loaded piston secured to the grip, the entry of fluid into the cylinder moving the piston to cause the grip to contact the crankshaft and the release of fluid in the cylinder permitting the spring to move the grip away from the crankshaft.

In FIGURE 10 I have shown a typical circuit for use in operating the elements described above. For example, with this arrangement a crankshaft loaded into the machine will automatically cause the brake to hold the element $e_1$ of the clutch fixed, to move element $e_2$ toward the element $e_1$ and be rotated by positioner motor 29 until the pin 74 is engaged in the aperture 72 at which time the brake releases the crankshaft and the positioner motor stops. The circuit of FIGURE 10 is along the lines of that shown in Patent 2,909,948 in the sense of having elements corresponding thereto and is adapted for coordination therewith as will be apparent from the description below.

The circuit includes a conventional sequence switch similar to that shown in Patent 2,909,948, the stepping solenoid of which is indicated at 100, the various rotatable wafer arms being indicated at $Wa1$, $Wa2$, etc. and the fixed terminals of each wafer being indicated by the numerals within the circles. The circuit also includes a timer motor indicated at 101 which has contacts labeled C–2 and C–5. The circuit includes the positioner motor 29 and has starter 102 for the balancing machine motor 20. For further details of the above-mentioned elements, reference may be had to Patent 2,909,948.

The circuit of FIGURE 10 also includes a clutch solenoid 103 which when energized operates a valve which controls the fluid in cylinder 40 of the clutch. The valve may be of conventional type, i.e., comprising a spring loaded spool moved by the energized solenoid 103 to admit fluid from a source to the cylinder 40 and moved by its spring when the solenoid is de-energized to bleed the cylinder 40. A brake relay is designated by numeral 104. This relay when energized closes its contacts 104a which are in series with a brake solenoid 106. The brake valve relay 104 also has contacts 104b in series with the positioner motor 29.

The brake solenoid 106 operates a valve which controls the flow of fluid to the brake cylinder. The valve may be of conventional design comprising a spring loaded spool moved by the energized solenoid 106 to admit fluid from a source to the cylinder 94 and moved by its spring when the solenoid is de-energized to bleed the cylinder.

A clutch relay is designated by 108 and this is adapted to be energized through the switch 88. The clutch relay has contacts 108a in series with the brake relay 104; the contacts 108a are opened when the clutch relay 108 is energized. Contacts 108b of the clutch relay are in series with the timer motor 101 and adapted to be closed when the relay 108 is energized.

In FIGURE 10 the numerals P–1 and P–2 designate lines which supply power to the various elements connected thereto. The manner of operation of the circuit of FIGURE 10 will next be explained.

With the wafers of the sequence switch on terminals 1, it will be seen that the wafer arm $Wa7$ supplies power to the clutch solenoid 103 to energize the same so that the clutch element $e_2$ is in retracted position. The unloader contacts 109 are adapted to be closed when the unloader has unloaded a crankshaft and is in a position away from the machine. The part switch contacts 110 are adapted to be closed when the loader has placed a crankshaft in the cradle and when the loader has then moved away from the machine, the loader contacts 111 close. At this time the sequence switch solenoid is energized and the wafer arms are stepped to terminals 2.

When the wafer arm $Wa7$ moves to terminal 2, the clutch solenoid is de-energized so that the spring 51 of the clutch moves the element $e_2$ toward element $e_1$. It will be observed that when wafer arm $Wa2$ is on terminal 1 or 2, the motor starter 102 is de-energized until the timer contacts C–2 close. When the wafer arm $Wa7$ moves to terminal 2, the brake relay 104 is energized and its contacts 104a close to energize the brake solenoid 106 so that the brake clamps the crankshaft and the element $e_1$ is held fixed. Also, the brake relay contacts 104b close to energize the positioner motor 29 which starts rotating the clutch element $e_2$.

When the pin 74 enters the aperture 72, the finger 89 operates the switch 88 to close its contacts so that the clutch relay 108 is energized. The clutch relay contacts 108a open to de-energize the brake relay 104. Contacts 104a open to de-activate the brake and contacts 104b open to de-activate the positioner motor. Further contacts 108b close to energize the timer motor 101 which then operates to close contacts C–2 for engaging the balancing motor for the unbalance determination and subsequently to close contacts C–5 to energize the sequence switch to step the same from terminal 2 to terminal 3 for subsequent operations, for example, as explained in Patent 2,909,948.

I claim:
1. In a balancing machine, apparatus to couple an article whose unbalance is to be determined with a reference generator for generating a signal for use in an unbalance determining operation, comprising:
- means to rotatably support an article whose unbalance is to be determined;
- reference signal generator means to generate a reference signal for use in an unbalance determination;
- a rotatable drive shaft;
- means forming a driving connection between said drive shaft and said generator;
- a pair of elements mounted to be relatively rotatable and movable toward and away from one another, one of the elements having means connecting the same with said article;
- detent mechanism on said elements operative when the elements are in a predetermined relative rotational position to effect a driving connection between the elements;
- brake means for rendering said one element non-rotatable;
- a fixed cylinder surrounding said shaft;
- a two-part piston surrounding said shaft and mounted for back and forth movement along the axis of the shaft, the piston and cylinder being constructed to form a fluid receiving chamber the force of which moves the piston in a direction away from said one element and one part being connected with the other of said elements and with said shaft for rotation therewith and the other part being connected with said cylinder and being non-rotatable;
- a sliding connection between said parts providing for rotation of said one part relative to said other part;
- a spring connected between said piston and said cylinder and urging the piston in a direction toward said one element; and
- means to slowly rotate said shaft until said elements are in the predetermined relative rotational position and said driving connection is effected and to thereupon stop said rotation and render said brake ineffective.

2. In a balancing machine, apparatus to couple and uncouple a test article with a reference generator, comprising:
- means to rotatably support an article whose unbalance is to be determined;
- reference signal generator means to generate a reference signal for use in an unbalance determination;
- a rotatable drive shaft;
- means forming a driving connection between said drive shaft and said generator;
- a first coupling element;
- means connecting said first coupling element for rotation with said article;
- brake means for rendering said first coupling element and said workpiece non-rotatable;
- a two-part member surrounding said drive shaft;
- means supporting one of said parts for movement in a direction along the rotational axis of said shaft toward and away from said first coupling element and to be non-rotatable;
- means connecting the other of said parts with said shaft for rotation therewith and for movement relative to the shaft in a direction along the axis of the shaft toward and away from said first coupling element;
- mechanism connected with said parts and providing for movement of the parts in unison along the axis of the shaft and for said other part to rotate relative to said one part;
- a second coupling element fixedly connected with said other part for axial and rotational motion therewith;
- detent mechanism on said coupling elements operative when the elements are in predetermined relative rotational and axial positions to effect a driving connection between the elements and operative when the elements are in a predetermined axial position to effect a non-driving condition; and
- mechanism to render said brake effective and to move said parts and said second coupling element in a direction toward said first coupling element and to rotate said shaft and said second coupling element until said elements are in said predetermined relative rotational and axial positions and said driving connection effected and to thereupon stop said rotation and render said brake ineffective and said mechanism also being operative to move said parts and said second coupling element in a direction away from said first coupling element to effect a non-driving condition of said coupling elements.

3. In a balancing machine, apparatus to couple and uncouple a test article with a reference generator, comprising:
- means to rotatably support an article whose unbalance is to be determined;
- reference signal generator means to generate a reference signal for use in an unbalance determination;
- a rotatable drive shaft;
- means forming a driving connection between said drive shaft and said generator;
- a first coupling element;
- means connecting said first coupling element for rotation with said article;
- brake means for rendering said first coupling element and said workpiece non-rotatable;
- a non-rotatable cylinder surrounding said drive shaft;
- a piston in said cylinder and surrounding said drive shaft;
- means supporting said piston for movement within the cylinder in a direction along the rotational axis of said shaft toward and away from said first coupling element and to be non-rotatable;
- a second coupling element surrounding said shaft;
- means connecting said second coupling element with said piston to be movable axially therewith and to be rotatable with respect to the piston;
- means connecting said second coupling element with said shaft to be rotatable therewith and to be movable axially with respect to the shaft;
- detent mechanism on said coupling elements operative when the elements are in predetermined relative rotational and axial positions to effect a driving connection between the elements and operative when the elements are in a predetermined relative axial position to effect a non-driving condition; and
- mechanism to render said brake effective and to cause said piston to effect movement of said second coupling element toward said first coupling element and to rotate said drive shaft and said second coupling element until said elements are in said predetermined relative rotational and axial positions and said driving connection is effected and to thereupon stop said rotation and render said brake ineffective and said mechanism also being operative to cause said piston to move said second coupling elements in a direction away from said first coupling element to effect a non-driving condition of said coupling elements.

4. In a balancing machine, apparatus to couple and uncouple a test article with a reference generator, comprising:
- a cradle to rotatably support an article whose unbalance is to be determined;
- reference signal generator means to generate a reference signal for use in an unbalance determination;
- drive mechanism for rotating the article including a shaft rotatably mounted on said cradle;
- means forming a driving connection between said shaft and said generator.
- a first coupling element;

means connecting said first coupling element for rotation with said article;

a cylinder surrounding said shaft and connected with said cradle so as to be non-rotatable;

a piston surrounding said shaft and mounted in said cylinder for back and forth movement along the axis of the shaft toward and away from said first coupling element, the piston and cylinder being constructed to form a chamber to receive fluid for moving the piston along said axis in a direction away from said first coupling element;

connections between said piston and said cradle to prevent rotation of the piston but providing for said axial motion;

a spring operatively connected between said piston and said cradle and urging the piston along said axis in a direction toward said first coupling element when the said chamber is in condition for the discharge of fluid therein;

a second coupling element surrounding said shaft;

connections between said second coupling element and said piston providing for the element to be moved axially with the piston and to be rotatable with respect thereto;

connections between said second coupling element and said shaft and providing for the second coupling element to be rotatable with the shaft and to be movable axially with respect to the shaft;

detent mechanism on said coupling elements operative when the elements are in predetermined relative rotational and axial positions to effect a driving connection between the elements and operative when the elements are in a predetermined relative axial position to effect a non-driving condition;

brake means for rendering said first coupling element and said workpiece non-rotatable; and mechanism to render said brake effective and to render said chamber in discharge condition so that said spring moves said piston and said second coupling element toward the first coupling element and said drive mechanism rotates said shaft and said second coupling element until said elements are in said relative rotational and axial positions and said drive connection is effected and thence to stop said rotation and render said brake ineffective, said mechanism also being operative to cause said chamber to receive fluid and move said piston and said second coupling element away from said first coupling element to effect a non-driving condition of said coupling elements.

References Cited in the file of this patent

UNITED STATES PATENTS

| | | |
|---|---|---|
| 1,341,796 | Gorman | June 1, 1920 |
| 1,447,985 | Hutchinson | Mar. 13, 1923 |
| 1,597,198 | Howell | Aug. 24, 1926 |
| 2,057,778 | Huff | Oct. 20, 1936 |
| 2,783,648 | Stovall et al. | Mar. 5, 1957 |
| 2,792,725 | Lannen | May 21, 1957 |
| 2,821,858 | King | Feb. 4, 1958 |
| 2,944,424 | Senger | July 12, 1960 |

FOREIGN PATENTS

| | | |
|---|---|---|
| 1,119,843 | France | June 26, 1956 |